United States Patent [19]

Buckman

[11] Patent Number: 4,989,979
[45] Date of Patent: Feb. 5, 1991

[54] OPTICAL FIBER SENSORS WITH FULL COMMON-MODE COMPENSATION AND MEASURAND SENSITIVITY ENHANCEMENT

[75] Inventor: A. Bruce Buckman, Austin, Tex.

[73] Assignee: Board of Regents, The University of Texas System, Austin, Tex.

[21] Appl. No.: 297,736

[22] Filed: Jan. 17, 1989

[51] Int. Cl.$^5$ .............................................. G01B 9/02
[52] U.S. Cl. .................................... 356/345; 356/346; 356/352; 250/227.27
[58] Field of Search ............... 356/345, 346, 350, 352, 356/355, 358, 360; 250/227; 350/96.29

[56] References Cited

U.S. PATENT DOCUMENTS

| | | |
|---|---|---|
| 4,162,397 | 7/1979 | Bucaro et al. . |
| 4,201,446 | 5/1980 | Geddes et al. .................. 350/96.29 |
| 4,235,113 | 11/1980 | Carome . |
| 4,322,829 | 3/1982 | Davis, Jr. et al. . |
| 4,329,058 | 5/1990 | James et al. . |
| 4,360,247 | 11/1982 | Beasley . |
| 4,405,198 | 9/1983 | Taylor . |
| 4,418,981 | 12/1983 | Stowe . |
| 4,420,258 | 12/1983 | Burns et al. ........................ 356/350 |
| 4,461,536 | 7/1984 | Shaw et al. . |
| 4,495,411 | 1/1985 | Rashleigh . |
| 4,530,603 | 7/1985 | Shaw et al. ........................ 356/350 |
| 4,581,530 | 4/1986 | Brogardh et al. . |
| 4,627,728 | 12/1986 | Willson . |
| 4,859,060 | 8/1989 | Katagiri et al. . |

FOREIGN PATENT DOCUMENTS 2179146A 2/1987 United Kingdom .
2186708A 8/1987 United Kingdom .

OTHER PUBLICATIONS

Jarzynski, et al., "Magnetic Field Sensitivity of an Optical Fiber with Magnetostrictive Jacket," Applied Optics, vol. 19, No. 22, pp. 3746-3748 (Nov. 15, 1980).
Koo, et al., "Characteristics of Fiber–Optic Magnetic–Field Sensors Employing Metallic Glasses," Optics Letters, vol. 7, No. 7, pp. 334-336 (Jul. 1982).
Bergh, et al., "An Overview of Fiber-Optic Gyroscopes," *Journal of Lightwave Technology*, vol. LT-2, No. 2, pp. 91-107 (Apr. 1984).
Koo, et al., "Detection Scheme in a Fiber-Optic Magnetic-Field Sensor Free From Ambiguity Due to Material Magnetic Hysteresis," Optics Letters, vol. 9, No. 6, pp. 257-259 (Jun. 1984).
Sixt, et al., "Passive Fiber Fabry-Perot Filter for Intensity-Modulated Sensors Referencing," *Journal of Lightwave Technology*, vol. LT-4, No. 7, pp. 926-932 (Jul. 1986).
Hofler, et al., "Thermal Noise in a Fiber Optic Sensor," *J. Acoust. Soc. Am.* 84(2), pp. 471-475 (Aug. 1988).

*Primary Examiner*—Samuel Turner
*Attorney, Agent, or Firm*—Arnold, White & Durkee

[57] ABSTRACT

Optical interferometric sensors exhibiting enhanced measurand sensitivity and complete common-mode compensation. The sensors add two additional light couplers and two optical paths with predetermined path lengths to known optical sensors such as the Mach-Zehnder, Recirculating Delay Line, Michelson-Morley, and Fabry-Perot sensors to produce sensors which exhibit complete common-mode compensation thereby greatly improving measured signal-to-noise ratio. An electronic feedback circuit can be employed in any of the sensors resulting in enhanced measured sensitivity.

56 Claims, 8 Drawing Sheets

OPTICAL FIBER SENSORS WITH FULL COMMON-MODE COMPENSATION AND MEASURAND SENSITIVITY ENHANCEMENT

TECHNICAL FIELD

The present invention relates to optical circuits including optical interferometric sensors.

BACKGROUND OF THE INVENTION

Optical interferometric sensors have enjoyed a wide variety of applications due to their high measurand sensitivity. The measurand can be any physical parameter which perturbs the effective refractive index, $n_{eff}$, or which perturbs the length of the sensing arm or optrode of the interferometer. Common measurands include temperature, pressure, acoustic energy, acceleration, force, electric and magnetic fields, rotation rate, fluid level, fluid flow rate, and the concentration of specific chemicals on or near a surface.

High measurand sensitivities are achieved by these optical interferometric sensors by use of long interferometer path lengths which can be realized with available low-loss single-mode optical fiber. However, a persistent problem with the application of fiber optic interferometric sensors has been that a sensor built to sense one particular measurand also responds to some degree to variations in other environmental variables (for example, pressure or temperature), and also responds to small variations in the wavelength of the light source used to power the interferometer.

In known interferometric sensors, for example, the Mach-Zehnder sensor (FIG. 1), and Recirculating Delay Line sensor (FIG. 2), increasing measurand sensitivity by using a longer optical path length for the sensing arm results in an undesirable increase in sensitivity to variations in the wavelength of the light source powering the sensor, and an undesirable increase in sensitivity to other environmental variations such as ambient pressure and temperature which affect $n_{eff}$.

Figure 1:
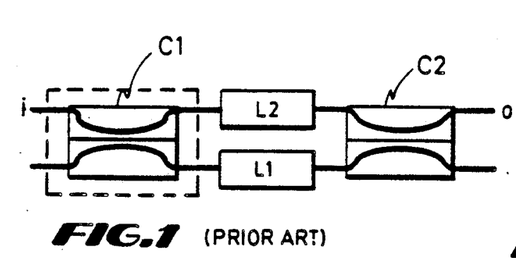
FIG. 1 is a prior art Mach-Zehnder sensor.

In the Mach-Zehnder sensor of FIG. 1, which includes a sensing arm, L1, a reference arm, L2, and two evanescent couplers, C1 and C2, the sensitivity to these "commonmode" variations in source wavelength or effective index in both arms of the Mach-Zehnder sensor can be reduced by making the sensing arm length, L1, nearly equal to the reference arm length L2, but at the price of reduced measurand sensitivity, Ss. In fact, when L1 equals L2, common-mode fluctuations are completely compensated for in the Mach-Zehnder sensor, but measurand sensitivity Ss is also reduced to zero.

Since the Recirculating Delay Line sensor (FIG. 2) is actually composed of a single optical path, Lf, through a resonant cavity including evanescent coupler, C3, no common-mode compensation is possible. In the Recirculating Delay Line device, sensitivity to the measurand can be increased relative to that of the known Mach-Zehnder interferometer by operating the sensor near cavity resonance, but sensitivity to environmental and wavelength fluctuations is also increased.

Figure 3:
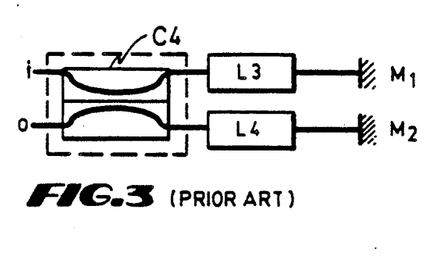
FIG. 3 is a prior art Michelson-Morley sensor.
Figure 4:
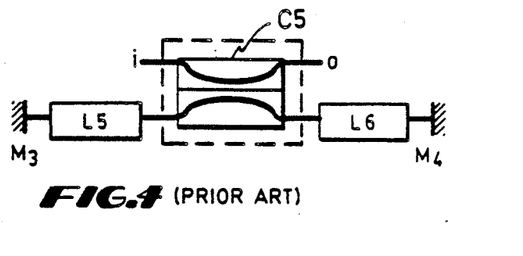
FIG. 4 is a prior art Fabry-Perot sensor.

The tradeoffs between increased measurand sensitivity and increased undesirable common-mode variation in the Mach-Zehnder and Recirculating Delay Line sensors, which are transmission-type sensors, also exist in reflection-type sensors, such as the Michelson-Morley sensor (FIG. 3), and the Fabry-Perot sensor (FIG. 4). The Michelson-Morley sensor of FIG. 3 includes sensing arm, L4, reference arm, L3, evanescent coupler, C4, and mirrors M1 and M2. Mirror M1 is fixed and mirror M2 can be moveable responsive to changes in a measurand, or both mirrors M1 and M2 can be fixed and an optrode can be included in sensing arm, L4. The Fabry-Perot sensor of FIG. 4 includes a resonant optical path including arms L5 and L6, evanescent coupler, C5, and mirrors M3 and M4. Mirror M3 is fixed and mirror M4 can be moveable responsive to changes in a measurand, or both mirrors M3 and M4 can be fixed and an optrode can be included in arm L6. In the Michelson-Morley sensor, similar to the Mach-Zehnder sensor, undesirable common-mode variation can be eliminated, but not without sacrificing measurand sensitivity. In the Fabry-Perot sensor, as in the Recirculating Delay Line sensor, common-mode compensation is not possible, and increasing measurand sensitivity by operating the sensor near cavity resonance necessarily increases undesirable common-mode variation.

In the Figures, the optical input is designated by, i, and the optical output is designated by, o. Also, optical paths are depicted with bold lines, and electrical paths are depicted with fine lines.

SUMMARY OF THE INVENTION

The present invention eliminates the apparent antithetical relationship existing between increasing measurand sensitivity and decreasing undesirable common-mode variation, by providing an optical interferometric sensor capable of high measurand sensitivity with complete common-mode compensation. The present invention can be applied to virtually any type of optical interferometric sensor including the Mach-Zehnder, Recirculating Delay Line, Michelson-Morley, and Fabry-Perot sensors, thereby greatly improving sensing accuracy in each of these sensor configurations. In addition, since undesirable commonmode variation is virtually eliminated, use of inexpensive light sources having relatively high spectral band-widths, and use of inexpensive evanescent couplers with higher losses, are possible without sacrificing high accuracy.

Another aspect of the present invention is measurand sensitivity enhancement by use of an electrical feedback network to boost measurand sensitivity above the maximum value achievable in the various types of sensors using optical means alone.

In general, the present invention comprises an optical common-mode compensation circuit connected to an optical sensing circuit having a measurand detecting optrode. Proper adjustment of the optical compensation circuit renders the sensor completely immune to environmental perturbations which simultaneously affect all optical paths of the compensation and sensing circuits. In addition, measurand sensitivity of the optical sensing circuit can be greatly enhanced by including a feedback network which senses the output of the optical sensing circuit and which adjusts the sensing circuit according to a magnitude of the output in order to maximize measurand sensitivity.

The optical sensing circuit portion of the invention employs an optrode to detect changes in a measurand. Changes in a measurand affect the light propagation characteristics, for example light attenuation or phase shift, of the optrode.

Common-mode compensation with measurand sensitivity can be accomplished by combining a properly adjusted optical common-mode compensation circuit with a properly adjusted optical sensing circuit including a feedback network. Thus, the present invention is an optical interferometric sensor which exhibits enhanced measurand sensitivity with complete common-mode compensation thereby rendering the sensor immune to environmental and source wavelength perturbations.

DETAILED DESCRIPTION OF THE PREFERRED EMBODIMENTS

Figure 5:
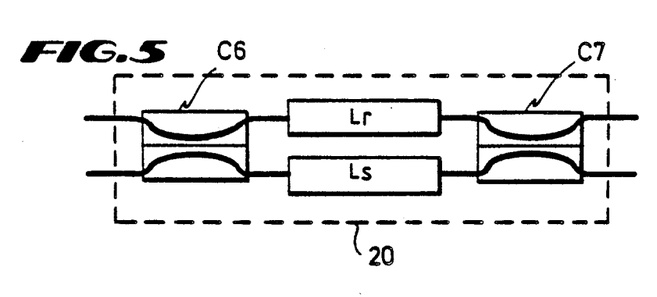
FIG. 5 is an optical circuit used for common-mode compensation according to the present invention.

FIG. 5 is an optical compensating circuit 20 which forms a component of the present invention. Optical compensating circuit 20 comprises evanescent couplers C6 and C7 connected with fiber-optic path lengths Lr and Ls. Compensating circuit 20 is used, according to the present invention, to replace the evanescent couplers enclosed in dashed lines in the prior art interferometric sensors shown in FIGS. 1-4, to produce common mode compensated interferometric sensors.

Although the disclosed embodiments of the present invention incorporate optical fiber optical paths, it will be understood that the invention is equally applicable to optical sensors using bulk optics or integrated optics.

Figure 2:
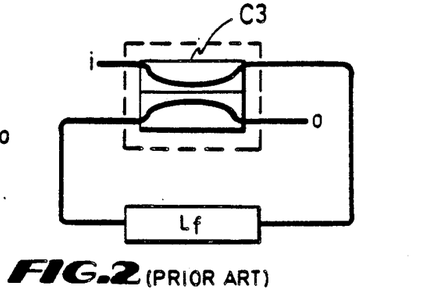
FIG. 2 is a prior art Recirculating Delay Line sensor.
Figure 6:
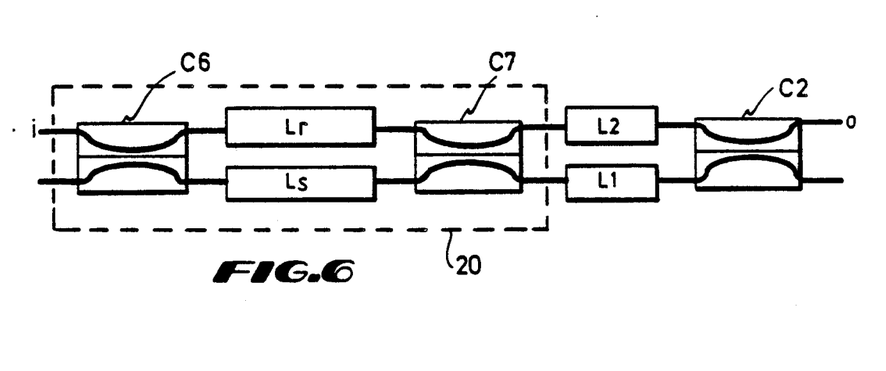
FIG. 6 is a common-mode compensated Mach-Zehnder sensor according to the present invention.
Figure 7:
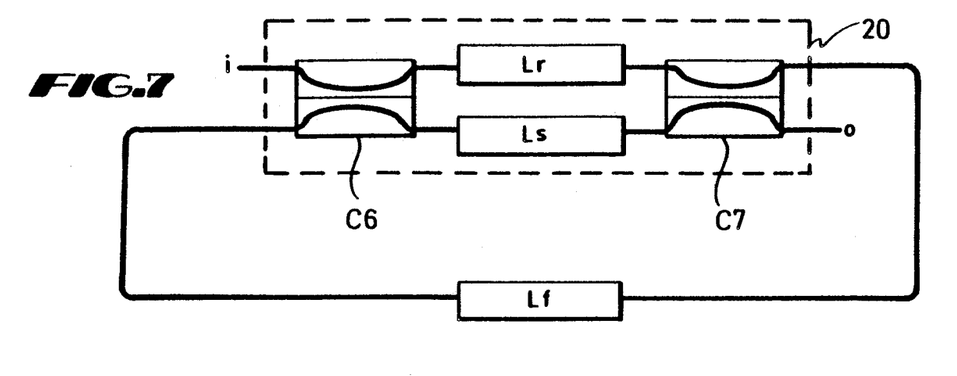
FIG. 7 is a common-mode compensated Recirculating Delay Line sensor according to the present invention.
Figure 8:
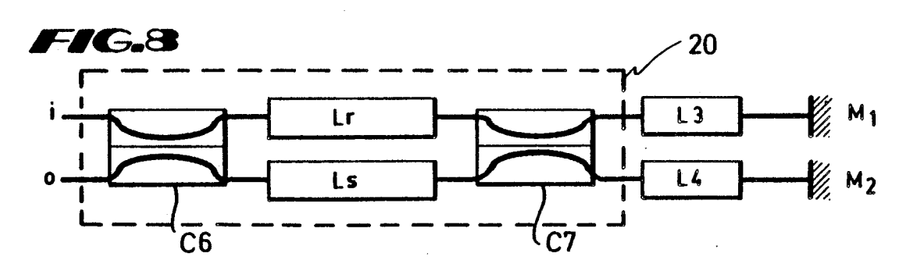
FIG. 8 is a common-mode compensated Michelson-Morley sensor according to the present invention.
Figure 9:
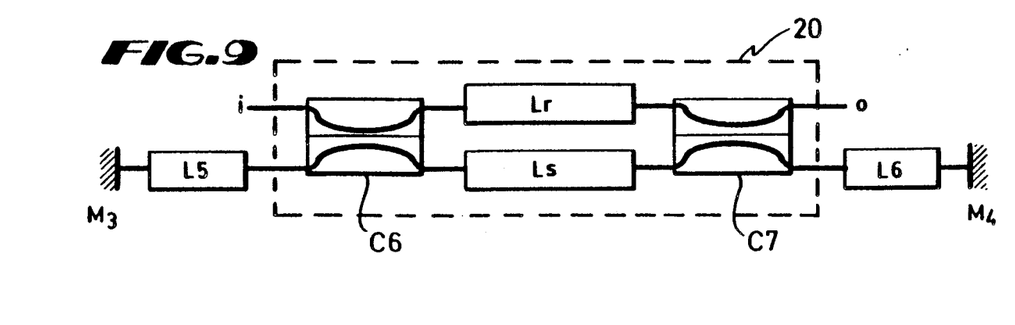
FIG. 9 is a common-mode compensated Fabry-Perot sensor according to the present invention.

Specifically, FIG. 6 is a common-mode compensated Mach-Zehnder interferometric sensor according to the present invention wherein optical compensating circuit 20 of FIG. 5 replaces evanescent coupler C1 of FIG. 1. FIG. 7 is a common-mode compensated Recirculating Delay Line interferometric sensor according to the present invention wherein evanescent coupler C3 of FIG. 2 is replaced by optical compensating circuit 20 of FIG. 5. FIG. 8 is a common-mode compensated Michelson-Morley interferometric sensor according to the present invention wherein evanescent coupler C4 of FIG. 3 is replaced by common-mode compensating circuit 20 of FIG. 5. Finally, FIG. 9 is a common-mode compensated Fabry-Perot interferometric sensor according to the present invention wherein evanescent coupler C5 of FIG. 4 is replaced by optical compensating circuit 20 of FIG. 5.

In each of the common-mode compensated sensors of FIGS. 6-9, the length of optical path Ls within compensating circuit 20 is appropriately adjusted in order to completely eliminate common-mode noise, as discussed in detail below with reference to FIGS. 10-13.

Figure 10:
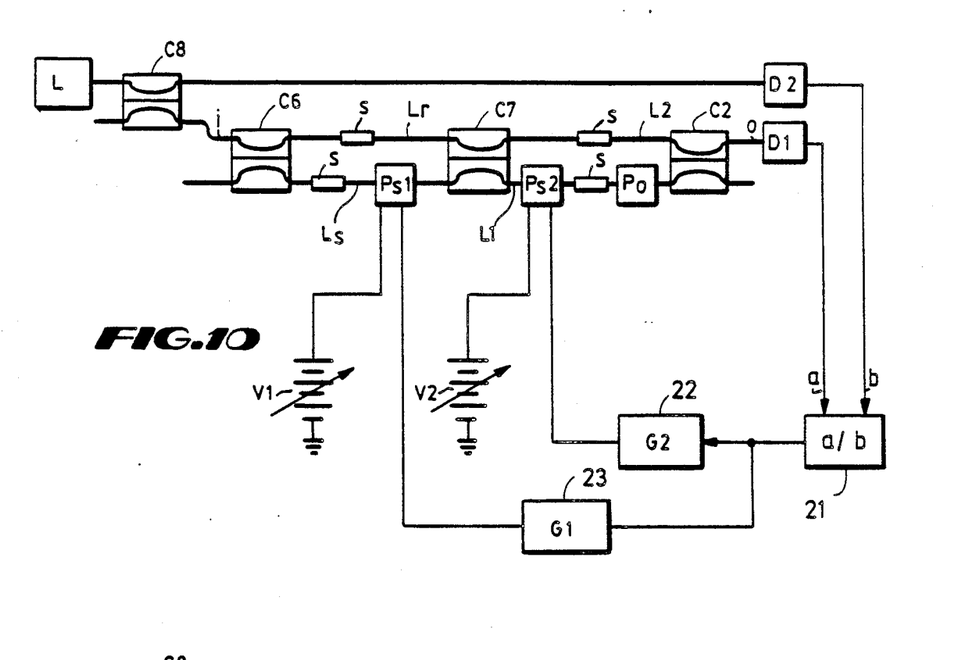
FIG. 10 is a common-mode compensated Mach-Zehnder sensor with enhanced measurand sensitivity according to the present invention.

Referring to FIG. 10, a common-mode compensated Mach-Zehnder interferometric sensor which also incorporates measurand sensitivity enhancement is presented. Components which are identical to those of FIG. 6 bear identical designators. The interferometric sensor of FIG. 10 includes evanescent couplers C2, C6, C7 and C8 which can be, for example, Interfuse 945 Series type couplers available from Amphenol Products of Lisle, Ill. When applied to bulk optic sensors, the evanescent couplers are replaced in a known manner by appropriate half-mirrors. Integrated evanescent couplers can be employed when integrated optical sensors are used. Fiber lengths L1, L2, Ls, and Lr are each preferably single-mode optical fibers, and each may include optical connectors S as needed. Bulk optical paths or integrated optical paths can also be used. Connectors S can be for example, Amphenol 905/906 Series type optical connectors available from Amphenol Products of Lisle, Ill. It will be understood that the present invention need not use connectors S, and the fiber-optic lengths may be continuous. Connectors S are included since such connectors are typically required in a practical environment, and since they introduce losses, which are also compensated by the present invention. Light source L oscillates at an optical wavelength $\lambda_0$, and has a Lorentzian dependence of output power on the frequency characterized by coherence time $\tau_c$. Light source L can be, for example, a light-emitting diode, laser diode, superradiant diode, gas laser or other narrow-line width light source.

Optrode P0 in FIG. 10 converts a measurand to a phase shift of guided light passing through it. The particular design of optrode P0 depends on the physical quantity being measured For example, when measuring a magnetic field, optrode P0 may comprise a length of optical fiber coated with magnetostrictive material. When measuring deformation force, optrode P0 may comprise a length of optical fiber which is elongated in response to a deformation force. When measuring hydrostatic or acoustic pressure, optrode P0 may be a length of optical fiber bonded to a diaphragm, or the like, which deforms in response to hydrostatic or acoustic pressure. Other measurands can be detected using appropriate optrodes P0, and the listing of these exemplary measurand sensitive optrodes should not be considered a limitation of the present invention. Also, as explained later in connection with FIG. 18, optrodes that convert a measurand into a change in transmittance of light can also be used in this invention.

The fiber-optic compensating portion of the sensor of FIG. 10 includes upper optical fiber path length Lr and lower optical fiber path length Ls, extending between the output ports of coupler C6 and the input ports of coupler C7. Common-mode environmental disturbances which affect the lengths of the optical paths in the sensor, and which might otherwise affect the sensor output, are compensated for by adjusting the phase difference between the upper optical path Lr and lower path Ls to an appropriate value by means of adjusting the compensating voltage signal V1 applied to phase shifter PS1. Phase shifter PS1 can be, for example, a hollow piezoelectric cylinder with electrodes available from Channel Industries of California, with a portion of fiber-optic length Ls wrapped around the hollow piezoelectric cylinder. However, other adjustable phase shifters can be used without departing from the scope of the present invention. For example, a lithium niobate phase modulator, such as a Lini Guide 947 Series integrated optical phase modulator, available from Amphenol Products of Lisle, Ill. can also be used. A simple mechanical cable stretcher is also acceptable.

It should be emphasized that phase shifter PS1 may be located within optical path Lr. A positive phase shift introduced into path Ls will have an effect identical to a negative phase shift of equal magnitude introduced into path Lr.

The fiber-optic sensing circuit includes upper optical path L2 and lower optical path L1 connected between couplers C7 and C2. Lower optical path L1 includes optrode P0 and phase shifter PS2 which is, similar to phase shifter PSI, preferably a hollow piezoelectric cylinder with electrodes, or the like. Once again, phase shifter PS2 may be located within path L2 since a positive phase shift introduced in path L2 will have an effect identical to a negative phase shift of equal magnitude introduced in path L1.

Evanescent coupler C8 connected to light source L provides a reference optical power level through an optical path to photodetector D2. This reference optical power level is not necessary if the intensity of light source L is sufficiently stable over time for the particular sensing application. However, coupler C8 is included for the sake of completeness.

Photodetector D1 is coupled to receive the optical output, o, from coupler C2. Photodetectors D1 and D2 can be any suitable photodiodes or phototransistors with sufficient sensitivity to respond to the light intensities reaching them over the optical paths.

The respective electrical outputs of diodes D1 and D2 are applied to ratio calculating circuit 21 which can be, for example, a type XR-2208 operational multiplier circuit available from Exar Corporation, of Sunnyvale, Calif., configured as a dividing circuit. Ratio circuit 21 calculates the output of photodetector D1 divided by the output of photodetector D2. The output of ratio circuit 21 is applied to amplifiers 22 and 23 which have gains G2 and G1, respectively. Amplifiers 22 and 23 can be, for example, any readily available operational voltage amplifier. The output of amplifier 22 is added to the adjustable bias voltage signal V2 and applied to phase shifter PS2, and the output of amplifier 23 is added to the adjustable bias voltage signal V1 and applied to phase shifter PS1.

As mentioned above, if the intensity of light source L is sufficiently stable, coupler C8, photodiode D2, and ratio calculating circuit 21 can all be eliminated, and the output of photodetector D1 can then be applied directly to the input of amplifiers 22 and 23 and the output of light source L can be applied directly to coupler C6.

Figure 11:
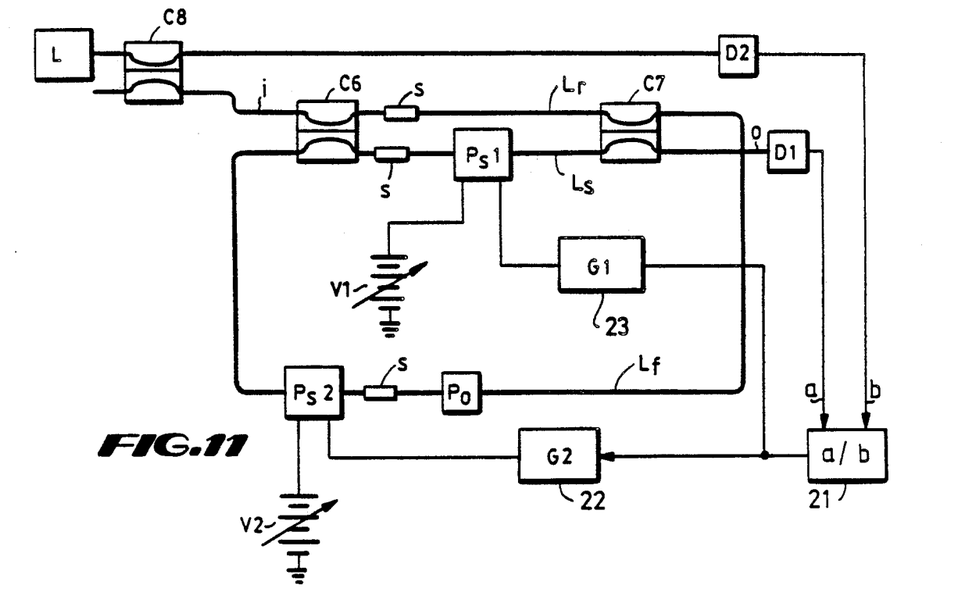
FIG. 11 is a common-mode compensated Recirculating Delay Line sensor with enhanced measurand sensitivity according to the present invention.

Referring to FIG. 11, a common-mode compensated Recirculating Delay Line interferometric sensor with measurand sensitivity enhancement according to the present invention is presented.

Evanescent couplers C6, C7, C8, light source L, photodetectors D1 and D2, ratio calculating circuit 21, amplifiers 22 and 23, phase shifters PS1 and PS2, variable voltage sources V1 and V2, and connectors S can be the same as those described above with respect to FIG. 10. In addition, optrode P0 can be any of the phase shift-type optrodes mentioned above with respect to FIG. 10.

Once again, it should be emphasized that if the intensity of light source L is sufficiently stable, coupler C8, photodetector D2, and ratio calculating circuit 21 can be eliminated, the output of photo detector D1 can be applied directly to the input of amplifiers 22 and 23, and light source L can be connected directly to coupler C6. Also, although connectors S are shown, they may be eliminated and continuous lengths of fibers may be used.

Figure 12:
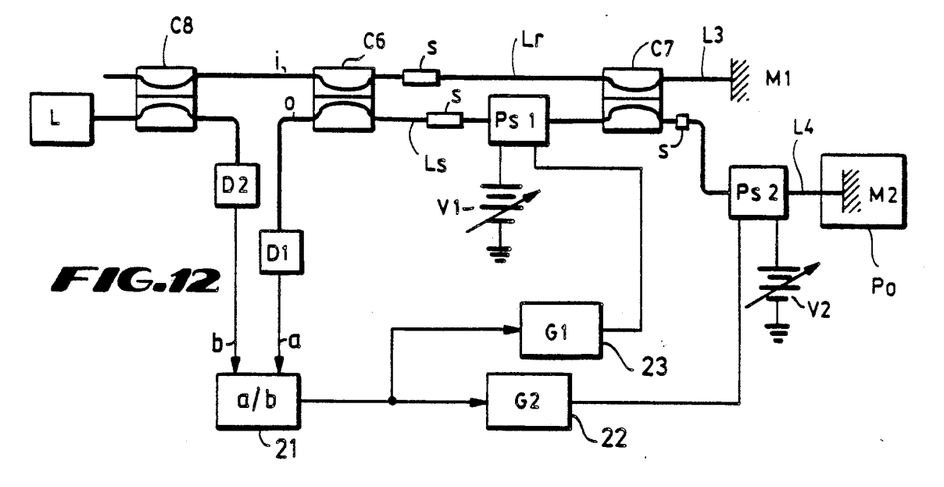
FIG. 12 is a common-mode compensated Michelson-Morley sensor with enhanced measurand sensitivity according to the present invention.

Referring now to FIG. 12, disclosed is a common-mode compensated Michelson-Morley interferometric sensor with measurand sensitivity enhancement. Once again, light source L, evanescent couplers C6, C7, C8, photodetectors D1 and D2, ratio calculating circuit 21, amplifiers 22 and 23, phase shifters PSI and PS2, variable voltage sources V1 and V2, and connectors S may be the same as those disclosed above in connection with FIG. 10. In the sensor of FIG. 12, optrode P0 is a reflecting-type optrode including mirror M2 which moves responsive to changes in a measurand, while mirror M1 remains fixed. In the alternative, both of mirrors M1 and M2 can be fixed, and a phase-shift type optrode can be included in path L4. Reflecting optrodes are well known in the art, and can either include a discrete mirror M2 or can be constructed by appropriately finishing and mirroring the end surface of optical fiber L4.

Once again, coupler C8, photodetector D2 and ratio calculating circuit 21 can be eliminated if the intensity of light source L is sufficiently stable. Connectors S can also be eliminated if desired.

Figure 13:
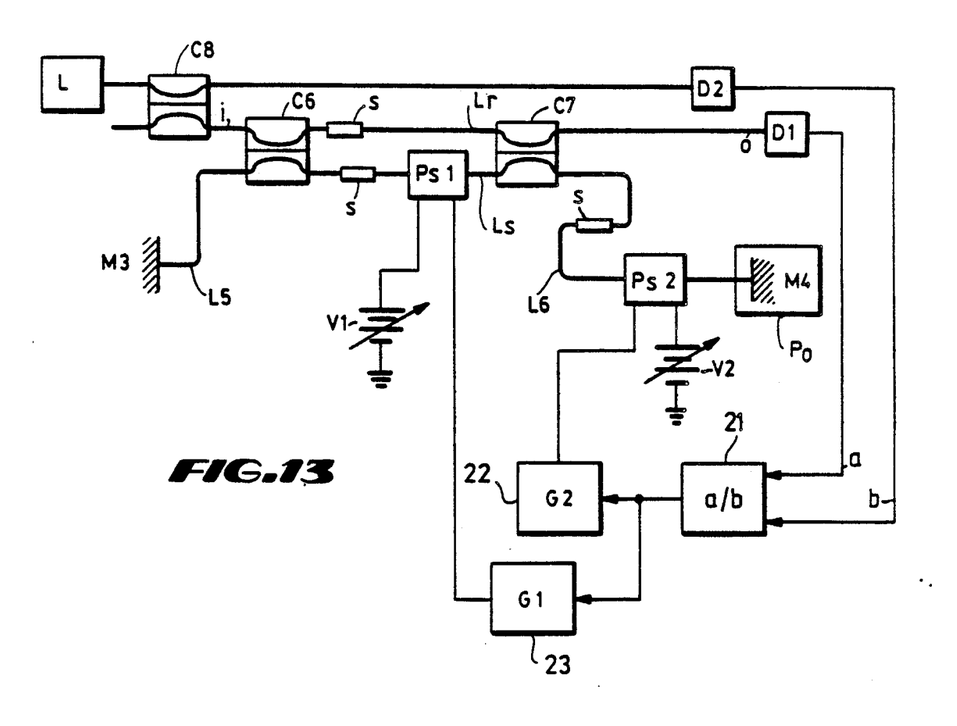
FIG. 13 is a common-mode compensated Fabry-Perot sensor with enhanced measurand sensitivity according to the present invention.

Finally, FIG. 13 presents a common-mode compensated Fabry-Perot interferometric sensor incorporating measurand sensitivity enhancement. Once again, light source L, evanescent couplers C6, C7, and C8, photodetectors D1 and D2, ratio calculating circuit 21, voltage amplifiers 22 and 23, phase shifters PS1 and PS2, variable voltage sources V1 and V2 and connectors S can be the same as those described above in connection with FIG. 10.

In the sensor of FIG. 13, optrode P0 can be a reflecting-type optrode and includes mirror M4 which moves responsive to changes in a measurand, or mirror M4 can be fixed and a phase-shift type optrode can be included in path L6.

Once again, as in the previously disclosed sensors, if the intensity of light source L is sufficiently stable, coupler C8, photodetector D2, and ratio calculating circuit 21 may be eliminated, the output of light source L may be applied directly to coupler C6, and the output of photodetector D1 may be applied directly to the input of voltage amplifiers 22 and 23. Also, connectors S may be eliminated if desired.

In each of the interferometric sensors of FIGS. 10–13, during initial set-up, voltages V1 and V2 are varied and the gains G1 and G2 of amplifiers 22 and 23 are adjusted to provide complete common-mode compensation and to maximize measurand sensitivity.

For example, in the common-mode compensated Mach-Zehnder sensor of FIG. 10, which is illuminated by light source L having a wavelength $\lambda_0$ and coherence time $\tau_c$, the relative phase difference, $\Phi$, between the upper optical path Lr and lower optical path Ls is given by the equation:

$$\Phi = \frac{2\pi}{\lambda_0} n_{eff}(Ls - Lr) + \Delta\phi_{PS1} + k1\tau = 2N\pi + \phi \quad (1)$$

Where k1 is a constant set by the gain G1 of amplifier 23, $\Delta\phi_{ps1}$ is the phase difference obtained by adjusting V1, and N is an interger representing the difference in length of optical paths LS and Lr in terms of wavelength, $\lambda_0$. The second form of equation (1) demonstrates that Ls and Lr are many optical wavelengths long and that the relative phase difference depends only on the modulo phase shift $\phi$.

The relative phase difference, P, between the lower optical path L1 and upper optical path L2 of the optical sensing portion of the circuit of FIG. 10 is given by the equation:

$$P = \frac{2\pi}{\lambda_0} n_{eff}(L1 - L2) + \Delta p_{PS2} + k2\tau + dp_m = 2M\pi + p \quad (2)$$

Where k2 is a constant set by the gain G2 of amplifier 22, $\tau$ is the transmittance of the sensor, $\Delta P_{ps2}$ is the phase shift obtained by adjusting voltage V2, $dp_m$ is the measurand phase shift produced by optrode P0 and M is an integer representing the difference in length of optical paths L1 and L2 in terms of wavelength, $\lambda_0$. The second form of equation (2) illustrates that the overall phase shift is many wavelengths long and that the interference conditions depend only on modulo phase shift, p.

The transmittance, $\tau$, of the Mach-Zehnder sensor of FIG. 10 (i.e., the ratio of the optical power incident on detector D1 to that incident on detector D2, or, if detector D2 is not used, the optical power incident on detector D1) can be shown to be:

$$\tau = \frac{1}{4}[(t_r^2 + t_s^2)(t_1^2 + t_2^2) + \quad (3)$$
$$2t_r t_s t_1 t_2 (\cos(\phi - p) e^{-|\Phi - P|/\theta} - \cos(\phi + p) e^{-|\Phi + P|/\theta}) +$$
$$2t_1 t_2 (t_s^2 - t_r^2)\cos(p) e^{-|P|/\theta} + 2t_r t_s (t_1^2 - t_2^2)\cos(\phi) e^{-|\Phi|/\theta}]$$

Where $t_r^2$, $t_s^2$, $t_1^2$, and $t_2^2$ are the transmittances of optical paths Ls, Lr, L1, and L2, respectively, including the losses in splices S, $\theta = \omega\tau_c$, and $\omega = 2\pi c/\lambda_0$ (c being the speed of light). As can be seen above in equation (1), $\Phi$ is a function of k1$\tau$, and in equation (2), P is a function of k2$\tau$ if there is any electrical feedback at all (i.e., if k1 and k2 are different from 0). To arrive at a solution for transmittance, $\tau$, the right hand side of equation (3) is called a function F ($\Phi$, P, $\tau$), and the equation:

$$\tau = F(\Phi, P, k1, k2, \tau) \quad (4)$$

is numerically solved For fixed path lengths Lr, Ls, L1 and L2, setting voltages V1 and V2, and the gain G of amplifier 22, sets $\Phi$, P, k1 and k2 in equation (4). The transmittance $\tau$ obtained from these settings is the value of $\tau$ which satisfies equation (4).

Appropriate combinations of settings of V1, V2, G1, and G2, all of which can be easily adjusted electronically, can be employed to achieve high measurand sensitivity, low environmental sensitivity, or a combination of the two.

Measurand sensitivity, Ss, is defined as a change in sensor transmittance, $\tau$, due to a change in the relative phase shift, P, of the optical sensing portion of the circuit. In other words:

$$Ss = |\partial\tau/\partial p| \quad (5)$$

Figure 14:
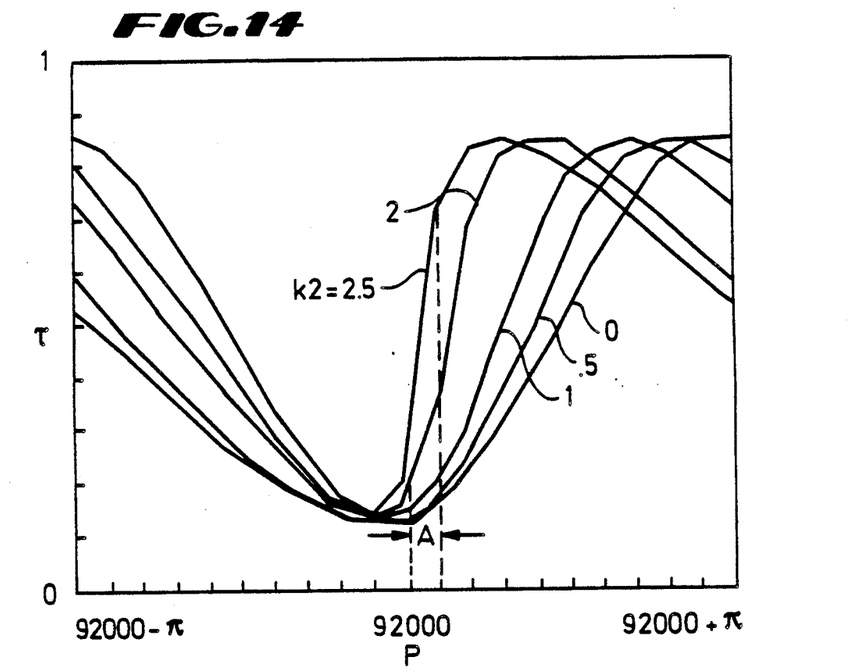
FIGS. 14-17 are graphical representations of sensor transmittance, $\tau$, versus relative phase difference, P, in a numerical example of the sensor of FIG. 10, for various control parameter settings.

FIG. 14 discloses a numerical solution of equation (4) over a range of P corresponding to a phase shift of $2\pi$ radians, for various values of G2 (parameter k2) with gain G1 (parameter k1) set at zero. In FIG. 14, $\Phi = 10^5 + \pi/4$, and $\omega\tau_c = 2\tau \times 10^6$.

The sinusoidal curve for k2=0 in FIG. 14 corresponds to the output expected for a conventional Mach-Zehnder sensor, without measurand sensitivity enhancement. As the electrical gain G2 of amplifier 22 is adjusted upwards to increase the optical feedback parameter k2, the relationship between transmittance $\tau$ and phase shift P becomes more non-linear, and includes regions where transmittance $\tau$ is highly sensitive to small changes in P, such as region A in FIG. 14.

Figure 15:
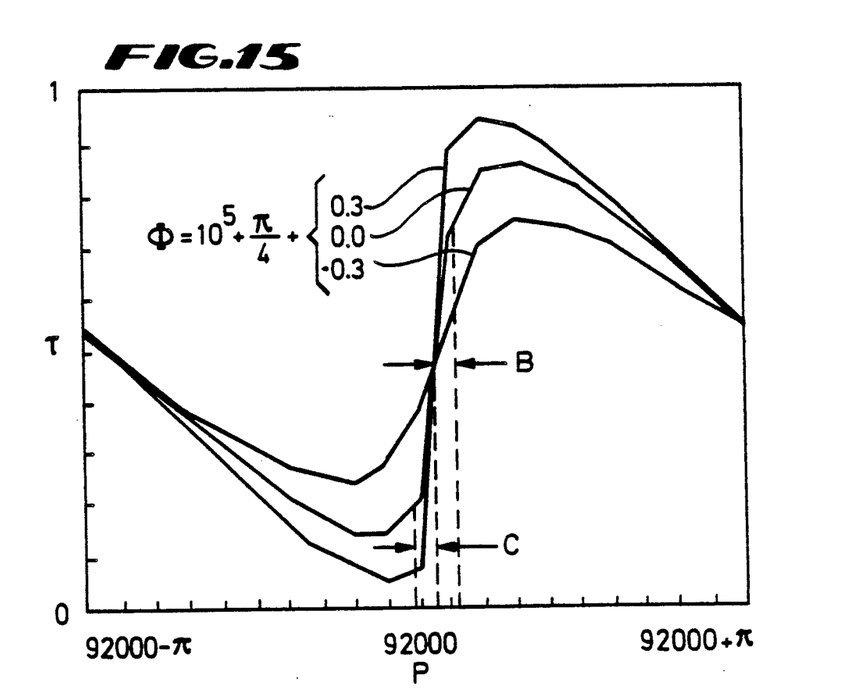

With changes in the measurand held at 0, i.e. $dp_m = 0$ in equation (2), voltage V2 is set to yield a $\Delta p_{Ps2}$ so that P lies near the center of region A in FIG. 14. Some adjustment in Ss can also be obtained by adjusting V1 so as to change phase bias $\Phi$ in the compensation circuit, as shown in FIG. 15. In FIG. 15, gain parameter k2 equals 2.5 and parameter k1 equals 0.

It is important to mention the effects of optical path lengths on these calculations. In any realistic procedure for constructing the sensor of FIG. 10, controlling the path lengths Lr, Ls, L1 and L2 to within less than about one millimeter is difficult. Since one millimeter is on the order of one thousand wavelengths in the optical paths, the values of the intergers M and N in equations (1) and (2) will be controllable by design only to within plus or minus a few thousand. Therefore, high measurand sensitivity Ss must be obtainable by adjusting k1 and k2, and the electrically controllable phase biases $\Delta p_{Ps2}$ and $\Delta\phi_{Ps1}$.

For all of the M and N that have been investigated by the inventor, k2 and $\phi$ can be adjusted to give measurand sensitivities on the order of those shown in FIGS. 14 and 15, which are about an order of magnitude larger than those obtainable with a conventional Mach-Zehnder sensor using the same optrode.

Turning now to common-mode compensation, many environmental disturbances which affect a sensor act primarily through changes they cause in the optical path phase differences $\Phi$ and P (equations (1) and (2) above). For example, the effect of a small variation in the wavelength $\lambda_0$ of the light source L can be modeled as:

$$\frac{\partial\Phi}{\partial\lambda_0} = \frac{2\pi}{\lambda_0} n_{eff}[Ls - Lr]\left[-\frac{1}{\lambda_0}\right] = -\frac{\Phi}{\lambda_0} \quad (6)$$

Similarly, if a spatially uniform temperature change, pressure variation, or other environmental perturbation affects $n_{eff}$ in the optical paths Ls, Lr, these environmental effects can be modeled as:

$$\frac{\partial \Phi}{\partial v} = \frac{2\pi}{\lambda_0} [Ls - Lr] \frac{\partial n_{eff}}{\partial v} = \frac{\Phi}{n_{eff}} \frac{\partial n_{eff}}{\partial v} \quad (7)$$

Where v is the environmental variable (pressure, temperature, etc.) which affects $n_{eff}$. The expressions for the environmental perturbations on P are the same as equations (6) and (7) with $\Phi$ being replaced by P and Ls-Lr being replaced by L1-L2. Minimizing the effect of these environmental perturbations requires the minimization of their effect on the sensor transmittance, $\tau$. This requires minimizing the equation:

$$\left| \frac{\partial \tau}{\partial v} \right| = \left| \left[ \Phi \frac{\partial \tau}{\partial \Phi} + p \frac{\partial \tau}{\partial P} \right] \frac{1}{n_{eff}} \frac{\partial n_{eff}}{\partial v} \right| \quad (8)$$

FIG. 15 suggests a simple way to minimize equation (8) with just a proper selection of phase bias $\Delta p_{PS2}$. In the range of phase bias shown in region B in FIG. 15, $\partial \tau / \partial p$ and $\partial \tau / \partial \Phi$ are both positive. However, in region C, $\partial \tau / \partial \Phi$ is negative. If the path differences Ls —Lr and L1—L2 are roughly equal, there will be some phase bias, located within region C, where the quantity in square brackets in equation (8) vanishes. This is the desired operating point for complete common mode compensation.

Figure 16:
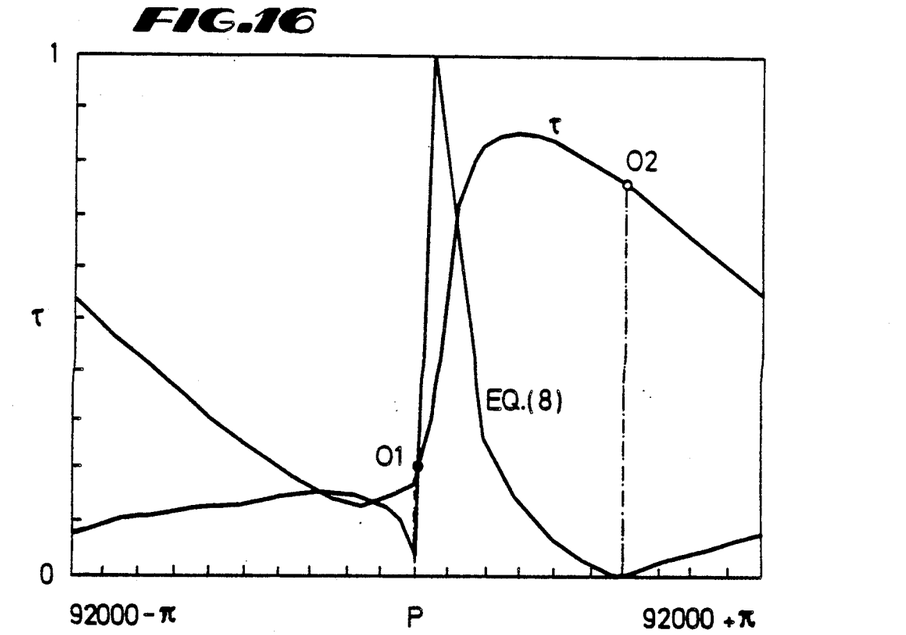

FIG. 16 shows the magnitude of the quantity within the square brackets in equation (8) versus P with the other design parameters the same as those for FIGS. 14-15. Referring to FIG. 16, there are two possible operating points 01 and 02, at which the phase bias for P could be set to give a sensitivity to common mode environmental perturbations that approaches zero. Since the slope of $\tau$ versus P does not vanish at either operating point 01 or 02, the sensor will have some measurand sensitivity at either operating point. In contrast, a conventional Mach-Zehnder optical sensor (FIG. 1), if adjusted for zero common-mode sensitivity will also have zero measurand sensitivity.

Figure 17:
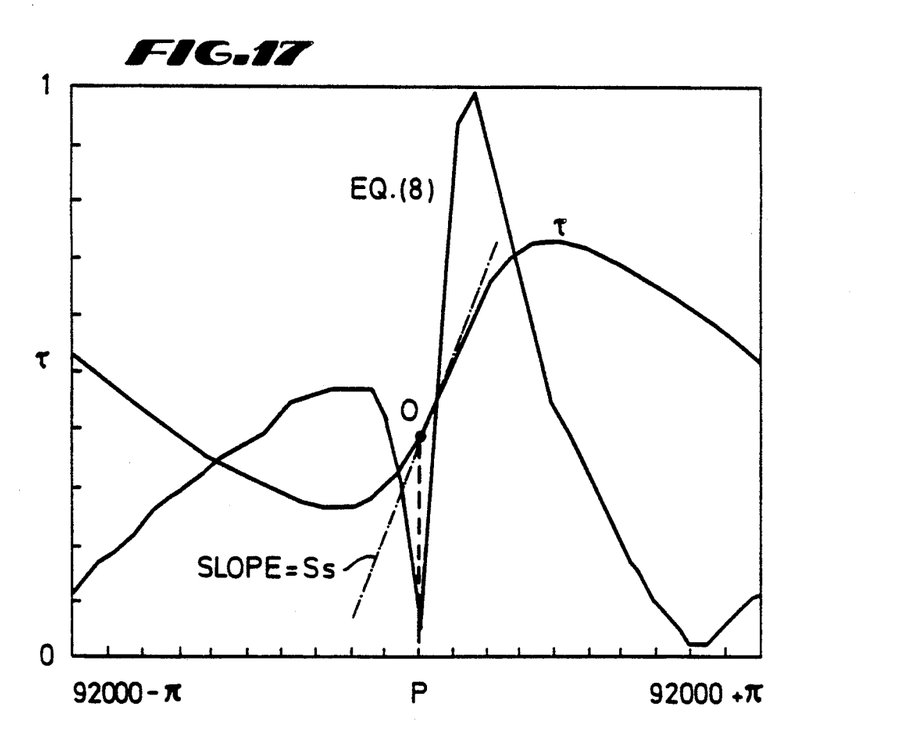

With some fine adjustments to k1, k2 and/or $\Phi$, the operating point for common-mode compensation can be made to lie in a region where measurand sensitivity Ss is approximately an order of magnitude greater than it would be in a conventional Mach-Zehnder sensor. FIG. 17 shows the transmittance and common-mode sensitivity for a numerical example of the sensor of FIG. 10 with k1=0, k2 =2.5, and $\Phi = 10^5 + \pi/4 - 0.33$.

At the operating point 0 of FIG. 17, the measurand sensitivity, Ss, as indicated by the slope of the straight line tangent to the $\tau$ versus P curve, is approximately an order of magnitude larger than the value expected for a similar Mach-Zehnder sensor. In addition, the common-mode sensitivity is also zero at this operating point 0.

The values for coherence time and splice and coupler transmittance used in the above calculations are typical of laser light sources and high quality splices. Lesser coherent light sources and/or higher optical losses in the splices and couplers of the sensor lead to the requirement of different k1, k2 and $\Phi$ in order to achieve the performance described here. For any case, it appears to be possible to determine a set of electronically controllable parameters V1, V2, G1, and G2 which lead to high measurand sensitivity and low common-mode sensitivity. This capability to electronically tune the sensor is a great advantage during sensor manufacture, since uncontrollable component-to-component variations in couplers, light source, fibers and splices can be electronically compensated.

With respect to the other interferometric sensor configurations of the present invention (FIGS. 11-13), electronically controllable parameters V1, V2, G1, and G2 can be adjusted in each of these sensors in a manner similar to that described above with respect to the Mach-Zehnder sensor of FIG. 10, to enhance measurand sensitivity while eliminating common-mode sensitivity.

The fiber-optic sensors of FIGS. 10-13 use optrodes, OP, that convert measurand changes to changes in the phase of light passing through optrode OP. In another class of optical measurements, measurand changes are converted to changes in the transmittance of the optrode. Examples include optical absorption in measuring cells containing liquids or gasses, position measurements, and the like. The present invention also contemplates common-mode compensation and measurand sensitivity enhancement in fiber-optic sensors employing transmittance-type optrodes.

Figure 18:
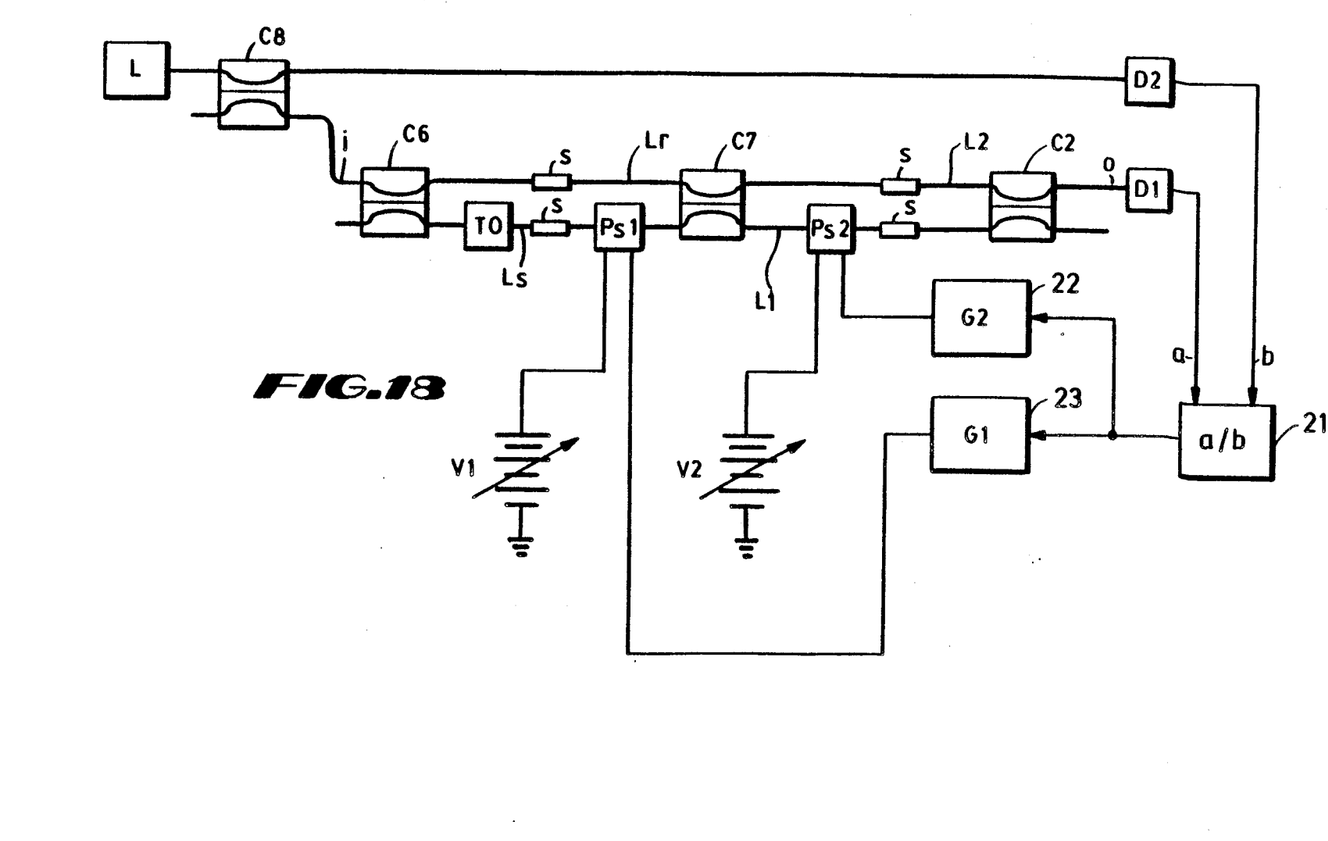
FIG. 18 is a common-mode compensated Mach-Zehnder sensor using a transmittance-type sensor with measurand sensitivity enhancement according to the present invention.

FIG. 18 is a common-mode compensated Mach-Zehnder sensor which incorporates measurand sensitivity enhancement, and which employs transmittance-type optrode, TO. Components which are identical to those of FIG. 10 bear identical numeral designators. The fiber-optic sensor of FIG. 18 includes evanescent couplers C2, C6, C7, and C8 which can be of the type previously mentioned. Optical lengths L1, L2, Ls and Lr are each preferably single-mode optical fibers, and each may include optical connectors S as needed, which can be of the type mentioned above. Once again, it is emphasized that the sensor of FIG. 1 need not employ connectors S, and the fiber-optic lengths may be continuous. Also, the optical paths may be bulk or integrated optical paths.

Optrode TO in FIG. 18 converts a measurand to a change in transmittance of guided light passing through it. The particular design of optrode TO depends on the physical quantity being measured. The fiber-optic compensating portion of the sensor of FIG. 18 includes upper optical fiber path L2 and lower optical fiber path L1, extending between the output ports of coupler C7 and the input ports of coupler C2. Common-mode environmental disturbances which might otherwise affect the sensor output are compensated for by adjusting the phase difference between upper path L2 and lower path L1 to an appropriate value by means of adjusting voltage signal V2 applied to phase shifter PS2.

The fiber-optic sensing circuit of the sensor of FIG. 18 includes upper optical path Lr and lower optical path Ls connected between couplers C6 and C7. Lower optical path Ls includes optrode TO and phase shifter PS1. Phase shifters PS1 and PS2 may be of the type mentioned earlier in connection with FIGS. 10-13.

Evanescent coupler C8 connected to light source L provides a reference optical power level through an optical fiber to photodetector D2. As mentioned above, this reference optical power level is not necessary if the power output intensity of light source L is sufficiently stable over time for the particular sensing application.

Photodetector D1 is coupled to receive the optical output, o, from coupler C2. Photodetectors D1 and D2 can be any suitable photodiodes or phototransistors with sufficient sensitivity to respond to the light intensities reaching them over the optical paths.

As above, ratio calculating circuit 21 is coupled with the outputs of diodes D1 and D2, and amplifiers 22 and 23 are coupled to amplify the output of ratio calculating circuit 21.

Phase shifter PS2 is controlled by compensating voltage V2 added to the output of amplifier 22, and phase shifter PS1 is controlled by voltage V1 added to the output of amplifier 23. As with the optical sensors of FIGS. 10–13, proper adjustment of voltages V1, V2, and the gains G1 and G2 of amplifiers 22 and 23, allows maximization of measurand sensitivity while improving common-mode compensation.

Figure 19:
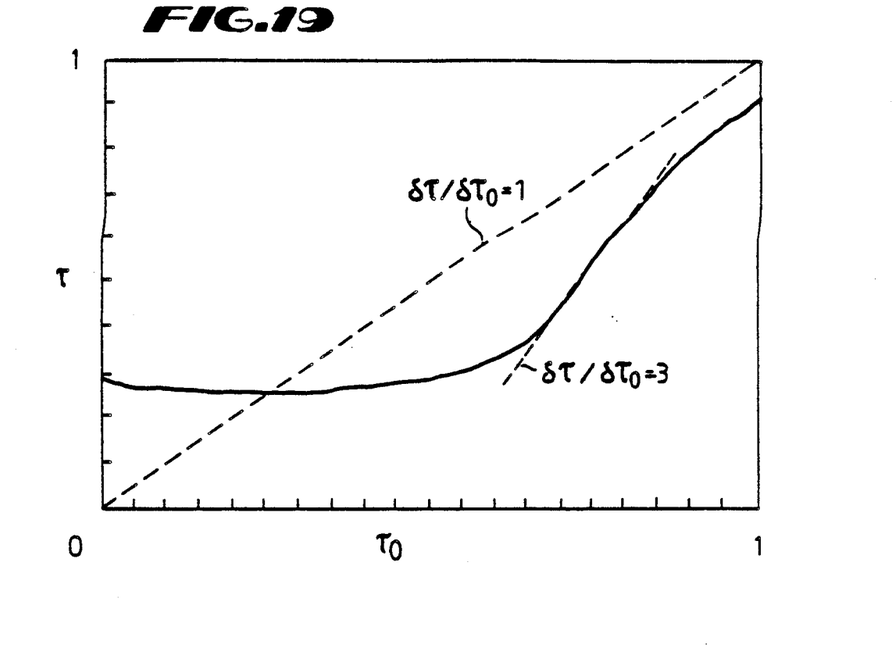
FIG. 19 is a graphical representation of sensor transmittance, $\tau$, versus optrode transmittance, $\tau_0$, for a numerical example of the sensor of FIG. 18.

FIG. 19 is a graph of the transmittance, $\tau$, of the sensor of FIG. 18 versus the transmittance, $\tau_0$, of optrode TO. In FIG. 19, voltage V1 is adjusted to set $\Phi = 10^5 + 5 \pi/8 + 0.19$, and voltage V2 is adjusted so that $P = 9.2 \times 10^4 + 0.1$.

With these settings, the sensitivity of the transmittance, $\tau$, of the sensor of FIG. 18 to changes in the transmittance, $\tau_0$, of optrode TO, is increased by a factor of 3 (within the range $0.70 > \tau_0 > 0.85$), over the sensitivity obtainable using the optrode TO alone.

The phase-shifting optrode type sensors of FIGS. 11–13 can also be easily modified to incorporate transmittance-type optrodes.

In all of the previous examples, the gain, G1, of amplifier 23 has been held at 0. Adjustment of gain G1 (parameter k1) to a value other than 0 affects the value of $\Phi$ in equation (1), and therefore also affects the value of $\tau$ calculated in equation (3). Thus, similar to the adjustment of parameter k2, adjustment of parameter k1 affects both common-mode compensation and measurand sensitivity. Therefore, if desired, parameter k2 can be set to a non-zero value to minimize common-mode noise sensitivity while maximizing measurand sensitivity.

Figure 20:
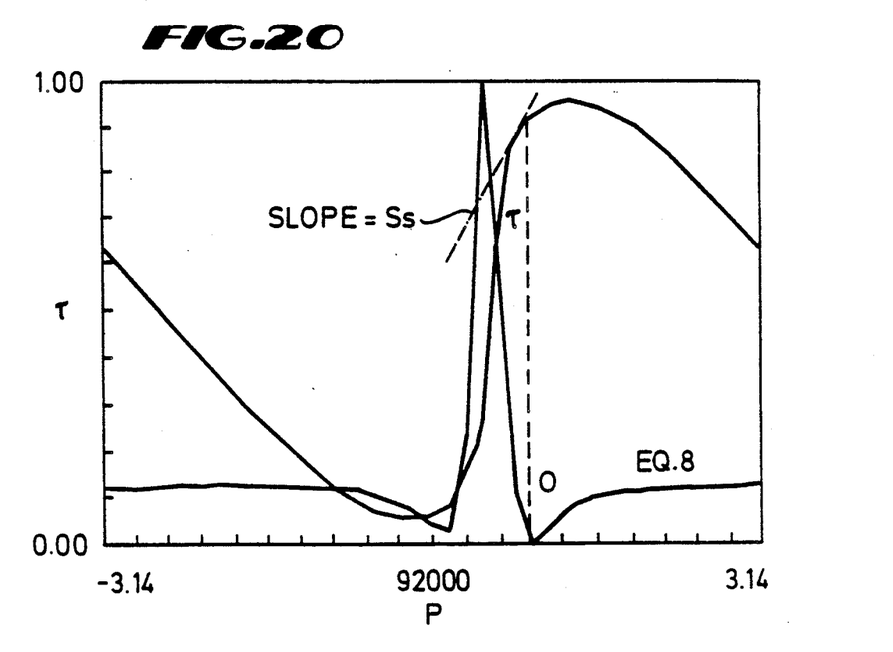
FIG. 20 is a graphical representation of sensor transmittance, $\tau$, versus relative phase difference, P, in a numerical example of the sensor of FIG. 10, with feedback provided to both the compensating and sensing circuits.

FIG. 20 is similar to FIG. 17 and presents a graphical representation of a numerical example of the sensor of FIG. 10 showing the transmittance and common-mode sensitivity with k1 = 0.8, k2 = 2.1, and := 105 + $\pi/4$ + 0.25.

Once again, at operating point 0 of FIG. 20, measurand sensitivity, Ss, and common-mode noise immunity are both improved over a Mach-Zehnder sensor which does not include the present invention.

Adjusting parameter k1 to a non-zero value also affects measurand sensitivity and common-mode compensation in the other optical sensors of the present invention (FIGS. 11–13).

While the invention has been described with reference to a number of preferred embodiments, it will be understood that these embodiments are by way of illustration, and not by way of limitation. One of ordinary skill in the art will appreciate that additions and changes may be made to the disclosed preferred embodiments, without departing from the spirit and scope of the invention.

I claim:

1. An optical sensor comprising:
   a light source;
   an optical sensing circuit connected to said light source and including an optrode for converting a change in a measurand into a change in a characteristic of light passing through said optrode, said optical sensing circuit having at least one optical output indicative of said measurand;
   means for controlling phase shifts of light propagating in said optical sensing circuit, including means for controlling phase shifts dependent upon said at least one optical output to maximize sensitivity of said at least one optical output to changes in said measurand;
   an optical compensating circuit, including a plurality of optical paths, connected to said light source and said optical sensing circuit; and
   means for controlling phase shifts of light propagating in said optical compensating circuit, including means for controlling phase shifts in at least one of said plurality of optical paths to minimize changes in said at least one optical output due to common-mode noise other than said measurand.

2. An optical sensor, as recited in claim 1, wherein said means for controlling phase shifts in said optical sensing circuit includes means for deriving an electrical signal proportional to said at least one optical output, and means for adjusting a length of an optical path in said optical sensing circuit according to a magnitude of said electrical signal.

3. An optical sensor as recited in claim 2, wherein said means for controlling phase shifts in said optical sensing circuit further comprises a piezoelectric transducer, connected to said means for producing an electrical signal, for stretching said length of said optical path in said optical sensing circuit.

4. An optical sensor as recited in claim 3, wherein said means for controlling phase shifts in said optical compensating circuit comprises means for adjusting a length of said at least one of said plurality of optical paths in said optical compensating circuit responsive to application of a compensating signal.

5. An optical sensor as recited in claim 1, further comprising:
   means for detecting an intensity of said light source;
   means for calculating a ratio of said at least one optical output to detected intensity of said light source; and
   means for adjusting a length of an optical path in said optical sensing circuit according to said ratio.

6. An optical sensor as recited in claim 1, wherein said means for controlling phase shifts in said optical compensating circuit comprises a piezoelectric transducer for stretching said at least one of said plurality of optical paths in said optical compensating circuit responsive to application of a compensating signal.

7. An optical sensor as recited in claim 1, wherein said optical sensing circuit is a Mach-Zehnder type sensor.

8. An optical sensor as recited in claim 1, wherein said optical sensing circuit is a Recirculating Delay Line type sensor.

9. An optical sensor as recited in claim 1, wherein said optical sensing circuit is a Michelson-Morley type sensor.

10. An optical sensor as recited in claim 1, wherein said optical sensing circuit is a Fabry-Perot type sensor.

11. An optical sensor as recited in claim 1, wherein said light source is a narrow-line width light source.

12. An optical sensor as recited in claim 11, wherein said light source is a laser diode.

13. An optical sensor as recited in claim 11, wherein said light source is a superradiant diode.

14. An optical sensor as recited in claim 11, wherein said light source is a gas laser.

15. An optical sensor as recited in claim 11, wherein said light source is a light emitting diode.

16. An optical sensor as recited in claim 1, wherein said optical sensing circuit includes an optical reference arm, and an optical sensing arm, said sensing arm including said optrode and including said means for controlling phase shifts in said optical sensing circuit.

17. An optical sensor as recited in claim 1, wherein said plurality of optical paths in said optical compensating circuit includes an optical reference arm and an optical sensing arm, said sensing arm including said means for controlling phase shifts in said optical compensating circuit.

18. An optical sensor as recited in claim 1, wherein said means for controlling phase shifts in said optical sensing circuit further includes, means for controlling phase shifts to minimize changes in said att least one optical output due to common-mode noise other than said measurand.

19. An optical sensor as recited in claim 1, wherein said means for controlling phase shifts in said optical compensating circuit further includes, means for controlling phase shifts dependent upon said at least one optical output to maximize sensitivity of said at least one optical output to changes in said measurand.

20. An optical sensor comprising:
a light source;
an optical sensing circuit connected to said light source and including an optrode for converting a change in a measurand into a change in a characteristic of light passing through said optrode, said optical sensing circuit having at least one optical output indicative of said measurand; and
a compensating circuit connected to said sensing circuit for controlling phase shifts of light propagating in said optical sensing circuit, including means for controlling phase shifts dependent upon said at least one optical output to modify a functional relationship between sensor transmittance and said characteristic of light by adjusting an operating point and a slope of said functional relationship, to maximize sensitivity of said at least one optical output to changes in said measurand.

21. An optical sensor as recited in claim 20, wherein said means for controlling phase shifts in said optical sensing circuit includes means for deriving an electrical signal proportional to said at least one optical output, and means for adjusting a length of an optical path in said optical sensing circuit according to a magnitude of said electrical signal.

22. An optical sensor as recited in claim 21, wherein said means for controlling phase shifts in said optical sensing circuit further comprises a piezoelectric transducer, connected to said means for producing an electrical signal, for stretching said length of said optical path in said optical sensing circuit.

23. An optical sensor as recited in claim 20, further comprising:
means for detecting an intensity of said light source;
means for calculating a ratio of said at least one optical output to detected intensity of said light source; and
means for controlling a length of an optical path in said optical sensing circuit according to said ratio.

24. An optical sensor as recited in claim 20, wherein said optical sensing circuit is a Mach-Zehnder type sensor.

25. An optical sensor as recited in claim 20, wherein said optical sensing circuit is a Recirculating Delay Line type sensor.

26. An optical sensor as recited in claim 20, wherein said optical sensing circuit is a Michelson-Morley type sensor.

27. An optical sensor as recited in claim 20, wherein said optical sensing circuit is a Fabry-Perot type sensor.

28. An optical sensor as recited in claim 20, wherein said light source is a narrow-line width light source.

29. An optical sensor as recited in claim 28, wherein said light source is a laser diode.

30. An optical sensor as recited in claim 28, wherein said light source is a superradiant diode.

31. An optical sensor as recited in claim 28, wherein said light source is a gas laser.

32. An optical sensor as recited in claim 28, wherein said light source is a light emitting diode 33. An optical sensor as recited in claim 20, wherein said optical sensing circuit includes an optical reference arm, and an optical sensing arm, said sensing arm including said optrode and including said means for controlling phase shifts in said optical sensing circuit 34. An optical sensor as recited in claim 20, wherein said means for controlling phase shifts of light in said optical sensing circuit further includes, means for controlling phase shifts to minimize changes in said at least one optical output due to common-mode noise other than said measurand.

35. An optical sensor comprising:
a light source;
an optical sensing circuit connected to said light source and including an optrode for converting a change in a measurand into a change in phase or intensity of light passing through said optrode, said optical sensing circuit having at least one optical output indicative of said measurand;
an optical compensating circuit, including a plurality of optical paths, connected to said light source and said optical sensing circuit; and
means for controlling phase shifts of light propagating in said optical compensating circuit, including means for controlling phase shifts in at least one of said plurality of optical paths to minimize changes in said at least one optical output due to common-mode noise, other than said measurand.

36. An optical sensor as recited in claim 35, wherein said means for controlling phase shifts in said optical compensating circuit comprises means for adjusting a length of said at least one of said plurality of optical paths in said optical compensating circuit responsive to application of a compensating signal.

37. An optical sensor as recited in claim 35, wherein said optical sensing circuit is a Mach-Zehnder type sensor.

38. An optical sensor as recited in claim 35, wherein said optical sensing circuit is a Recirculating Delay Line type sensor.

39. An optical sensor as recited in claim 35, wherein said optical sensing circuit is a Michelson-Morley type sensor.

40. An optical sensor as recited in claim 35, wherein said optical sensing circuit is a Fabry-Perot type sensor.

41. An optical sensor as recited in claim 35, wherein said light source is a narrow-line width light source.

42. An optical sensor as recited in claim 41, wherein said light source is a laser diode.

43. An optical sensor as recited in claim 41, wherein said light source is a superradiant diode.

44. An optical sensor as recited in claim 41, wherein said light source is a gas laser.

45. An optical sensor as recited in claim 41, wherein said light source is a light emitting diode.

46. An optical sensor as recited in claim 35, wherein said plurality of optical paths in said optical compensating circuit includes an optical reference arm and an optical sensing arm, said sensing arm including said means for controlling phase shifts in said optical compensating circuit.

47. An optical sensor as recited in claim 35, wherein said means for controlling phase shifts in said optical compensating circuit further includes, means for controlling phase shifts in said at least one of said plurality of optical paths dependent upon said at least one optical output to maximize sensitivity of said at least one optical output to changes in said measurand.

48. A method of optically sensing changes in a measurand, comprising:
   providing an optical sensing circuit, including a plurality of optical paths and at least one optical output;
   providing an optical compensating circuit, connected to said optical sensing circuit, including a plurality of optical paths;
   generating light for application to said sensing circuit and said compensating circuit;
   changing a characteristic of light propagating in at least one of said plurality of optical paths of said sensing circuit responsive to changes in a measurand to effect a corresponding change in said at least one optical output;
   adjusting a phase shift of light propagating in said at least one of said plurality of optical paths of said sensing circuit responsive to said at least one optical output to maximize sensitivity of said at least one optical output to changes in said measurand; and
   adjusting a phase shift of light propagating in at least one of said plurality of optical paths of said compensating circuit to minimize sensitivity of said at least one optical output to common-mode environmental perturbations.

49. A method as recited in claim 48, wherein said step of adjusting a phase shift of light propagating in said at least one of said plurality of optical paths of said sensing circuit, comprises:
   sensing an intensity of generated light;
   calculating a ratio of said at least one optical output to said intensity of generated light; and
   adjusting a phase shift of light propagating in said at least one of said plurality of optical paths responsive to said ratio.

50. A method as recited in claim 48, further comprising:
   adjusting said phase shift of light propagating in said at least one of said plurality of optical paths of said sensing circuit to minimize sensitivity of said at least one optical output to common-mode perturbations.

51. A method as recited in claim 48, further comprising:
   adjusting said phase shift of light propagating in said at least one of said plurality of optical paths of said compensating circuit responsive to said at least one optical output to maximize sensitivity of said at least one optical output to changes in said measurand.

52. A method of optically sensing changes in a measurand, comprising:
   providing an optical sensing circuit having at least one optical output;
   providing an optical compensating circuit, connected to said optical sensing circuit, including a plurality of optical paths;
   generating light for application to said sensing circuit and said compensating circuit;
   changing said at least one optical output responsive to changes in a measurand; and
   adjusting a phase shift of light propagating in at least one of said plurality of optical paths of said compensating circuit to minimize sensitivity of said at least one optical output to common-mode environmental perturbations.

53. A method as recited in claim 52, further comprising:
   adjusting said phase shift of light propagating in said at least one of said plurality of optical paths of said compensating circuit responsive to said at least one optical output to maximize sensitivity of said at least one optical output to changes in said measurand.

54. A method of optically sensing changes in a measurand, comprising:
   providing an optical sensing circuit including a plurality of optical paths and at least one optical output;
   generating light for application to said sensing circuit;
   changing a characteristic of light propagating in at least one of said plurality of optical paths responsive to changes in a measurand to effect a corresponding change in said at least one optical output; and
   adjusting a phase shift of light propagating in said at least one of said plurality of optical paths responsive to said at least one optical output to modify a functional relationship between sensor transmittance and said characteristic of light by adjusting an operating point and a slope of said functional relationship, to maximize sensitivity of said at least one optical output to changes in said measurand.

55. A method as recited in claim 54 wherein said step of adjusting comprises:
   sensing an intensity of generated light;
   calculating a ratio of said at least one optical output to said intensity of generated light; and
   adjusting a phase shift of light propagating in said at least one of said plurality of optical paths responsive to said ratio.

56. A method as recited in claim 54, further comprising:
   adjusting said phase shift of light propagating in said at least one of said plurality of optical paths to minimize sensitivity of said at least one optical output to common-mode perturbations.

* * * * *